US009894253B2

(12) United States Patent
Ogata et al.

(10) Patent No.: US 9,894,253 B2
(45) Date of Patent: Feb. 13, 2018

(54) PORTABLE DEVICE, COMMUNICATION SYSTEM, COMMUNICATION CONNECTION METHOD, AND COMPUTER-READABLE RECORDING MEDIUM

(71) Applicant: Olympus Corporation, Shibuya-ku, Tokyo (JP)

(72) Inventors: Yoshihisa Ogata, Hachioji (JP); Keito Fukushima, Mitaka (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/974,459

(22) Filed: Dec. 18, 2015

(65) Prior Publication Data
US 2016/0182785 A1 Jun. 23, 2016

(30) Foreign Application Priority Data
Dec. 22, 2014 (JP) ................................. 2014-259339

(51) Int. Cl.
H04N 5/225 (2006.01)
H04N 5/372 (2011.01)
(Continued)

(52) U.S. Cl.
CPC ....... H04N 5/2254 (2013.01); H04N 5/23203 (2013.01); H04N 5/23206 (2013.01);
(Continued)

(58) Field of Classification Search
CPC ............. H04N 5/2254; H04N 5/23203; H04N 5/23206; H04N 5/23245; H04N 5/372;
(Continued)

(56) References Cited

U.S. PATENT DOCUMENTS 7,961,217 B2 * 6/2011 Yamagishi ......... H04N 1/00307
348/207.1
2003/0142631 A1 * 7/2003 Silvester ............... H04L 1/0001
370/252

(Continued)

FOREIGN PATENT DOCUMENTS

JP 2003-250079 9/2003

Primary Examiner — Tuan Ho
Assistant Examiner — Marly Camargo
(74) Attorney, Agent, or Firm — John C. Pokotylo; Pokotylo Patent Services

(57) ABSTRACT

A portable device includes: a first communication unit configured to communicatively connect with an external communication device by using one of communication channels; a communication state determination unit configured to determine a communication state for each communication channel; a mode switching unit configured to switch a communication mode of the portable device between: a stable communication mode for establishing communication connection with the communication device by using a communication channel in a preferable communication state in the communication channels in accordance with a determination result obtained by the communication state determination unit; and a connection priority communication mode for establishing communication connection with the communication device by using a predetermined communication channel in the communication channels without determination by the communication state determination unit; and a communication controller configured to start communication connection with the communication device via the first communication unit in the selected communication mode.

8 Claims, 9 Drawing Sheets

(51) Int. Cl.
   *H04N 5/262* (2006.01)
   *H04N 5/232* (2006.01)
   *H04N 5/369* (2011.01)
   *H04W 52/02* (2009.01)

(52) U.S. Cl.
   CPC .... *H04N 5/23245* (2013.01); *H04W 52/0229* (2013.01); *Y02B 60/50* (2013.01)

(58) Field of Classification Search
   CPC ............ H04N 5/26228; H04N 5/3696; H04W 52/0229; Y02B 60/50
   USPC ........... 348/211.1, 211.2, 211.99–211.14, 14; 455/41.2, 420
   See application file for complete search history.

(56) References Cited

U.S. PATENT DOCUMENTS

| | | | | |
|---|---|---|---|---|
| 2010/0214398 | A1* | 8/2010 | Goulart | H04N 5/00 348/61 |
| 2011/0309921 | A1* | 12/2011 | Tachibana | H04B 7/14 340/425.1 |
| 2013/0072120 | A1* | 3/2013 | Wu | G08C 17/02 455/41.2 |
| 2013/0267172 | A1* | 10/2013 | Ko | H04B 5/0031 455/41.1 |
| 2013/0279472 | A1* | 10/2013 | Gassend | H04W 36/14 370/331 |
| 2015/0350290 | A1* | 12/2015 | Yang | H04L 65/80 348/14.02 |

* cited by examiner

PORTABLE DEVICE, COMMUNICATION SYSTEM, COMMUNICATION CONNECTION METHOD, AND COMPUTER-READABLE RECORDING MEDIUM

CROSS-REFERENCE TO RELATED APPLICATIONS

This application is based upon and claims the benefit of priority from Japanese Patent Application No. 2014-259339, filed on Dec. 22, 2014, the entire contents of which are incorporated herein by reference.

BACKGROUND OF THE INVENTION

1. Field of the Invention

The present invention relates to a portable device, a communication system, a communication connection method, and a computer-readable recording medium.

2. Description of the Related Art

There has been a technology of an imaging device such as a digital camera, which is a portable device carried by a user, known in recent years as such a technology which sequentially transmits image data obtained by imaging to an external communication device such as a cellular phone by utilizing a communication technology (for example, see Japanese Laid-open Patent Publication No. 2003-250079).

Japanese Laid-open Patent Publication No. 2003-250079 describes a technology associated with remote control of an imaging device by using a communication device.

More specifically, according to the technology described in Japanese Laid-open Patent Publication No. 2003-250079, the communication device sequentially receives image data transmitted from the imaging device, and sequentially displays live-view images corresponding to the image data on a display unit provided on the communication device. A camera user inputs a capturing operation to the communication device to allow capturing by the imaging device at a desired time, while checking the live-view images displayed on the display unit of the communication device. In accordance with this capturing operation, a capturing instruction is transmitted from the communication device to the imaging device. The imaging device having received this capturing instruction generates image data of a subject by imaging the subject, and transmits the generated image data to the communication device.

In general, communication connection as described below is established between the foregoing imaging device and communication device.

When the camera user turns on the power of the imaging device in the power-on state of the communication device, the imaging device determines a communication state for each of a plurality of communication channels provided for communication with the communication device. Then, the imaging device establishes communication connection with the communication device by using a communication channel in a preferable communication state in the plurality of communication channels.

SUMMARY OF THE INVENTION

A portable device according to one aspect of the present invention includes: a first communication unit configured to communicatively connect with an external communication device by using any one of a plurality of communication channels; a communication state determination unit configured to determine a communication state for each of the plurality of communication channels; a mode switching unit configured to switch a communication mode of the portable device between: a stable communication mode for establishing communication connection with the communication device by using a communication channel in a preferable communication state in the plurality of communication channels in accordance with a determination result obtained by the communication state determination unit; and a connection priority communication mode for establishing communication connection with the communication device by using a predetermined communication channel in the plurality of communication channels without determination by the communication state determination unit; and a communication controller configured to start communication connection with the communication device via the first communication unit in the communication mode selected by the mode switching unit.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Modes for carrying out the present invention (hereinafter referred to as embodiments) are hereinafter described with reference to the drawings. The present invention is not limited to the embodiments specifically described herein. Similar parts contained in the description with reference to the respective drawings have been given similar reference numbers.

First Embodiment

General Configuration of Communication System

Figure 1:
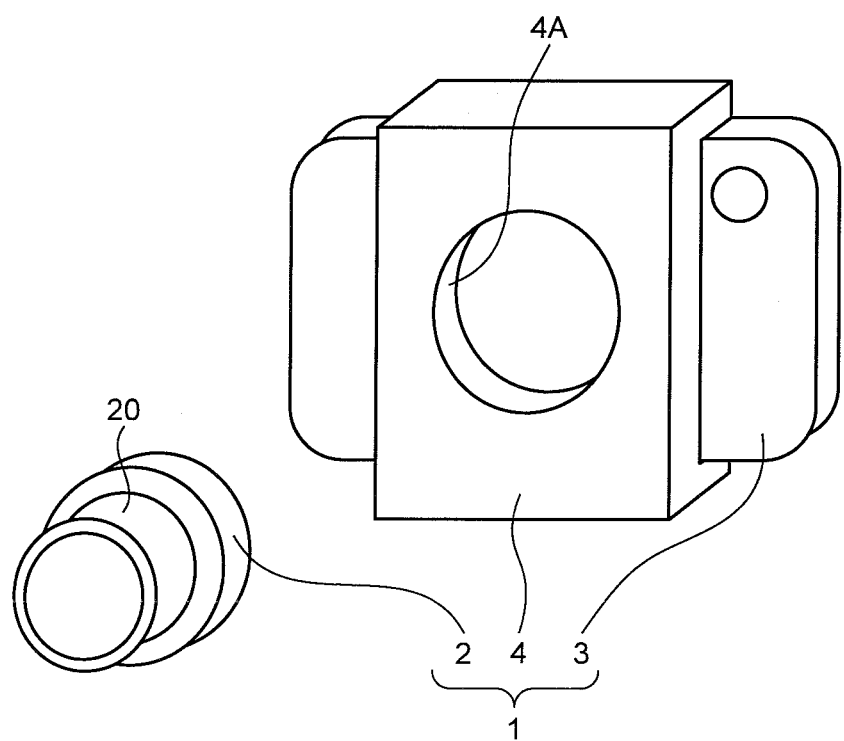
FIG. 1 is a view schematically illustrating a configuration of a communication system according to a first embodiment of the present invention.
Figure 2:
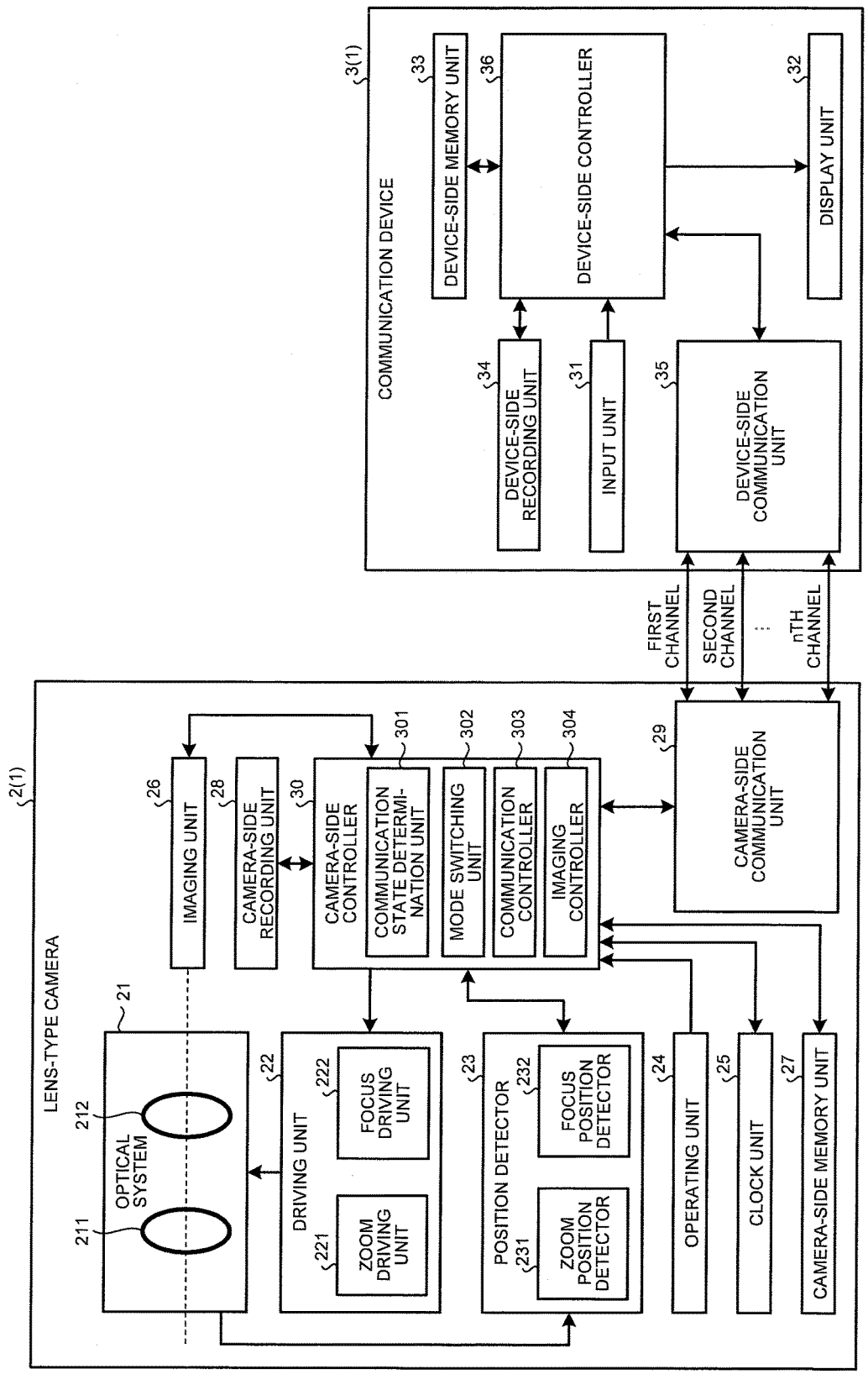
FIG. 2 is a block diagram illustrating the configuration of the communication system illustrated in FIG. 1.

FIG. 1 is a view schematically illustrating a configuration of a communication system 1 according to a first embodiment of the present invention. FIG. 2 is a block diagram illustrating the configuration of the communication system 1.

As illustrated in FIG. 1 or 2, the communication system 1 is a system which includes a lens-type camera 2 and a communication device 3 connected with each other such that information is transmittable and receivable to and from each other via wireless communication, and an attachment 4 (FIG. 1), as a system realizing remote control of the lens-type camera 2 by using the communication device 3.

Configuration of Attachment

The attachment 4 is a component which mechanically connects the lens-type camera 2 and the communication device 3. More specifically, the attachment 4 is attached to a rear surface of the communication device 3 as illustrated in FIG. 1. The attachment 4 includes an attachment hole 4A which is circular in the plan view and receives the lens-type camera 2.

The communication system 1 has a general shape like a digital camera when the lens-type camera 2 and the communication device 3 are mechanically connected with each other via the attachment 4.

The attachment 4 included in the communication system 1 is not an essential component of the communication system 1, and may be eliminated from the communication system 1.

Configuration of Lens-Type Camera

A main part of the present invention included in a configuration of the lens-type camera 2 is hereinafter chiefly described.

As illustrated in FIG. 2, the lens-type camera 2 includes an optical system 21, a driving unit 22, a position detector 23, an operating unit 24, a clock unit 25, an imaging unit 26, a camera-side memory unit 27, a camera-side recording unit 28, a camera-side communication unit 29, and a camera-side controller 30. The respective components 21 through 30 are housed in a lens barrel 20 (FIG. 1) which generally has a substantially cylindrical shape. Accordingly, the lens-type camera 2 generally has a substantially similar shape as a general shape of a so-called interchangeable lens as illustrated in FIG. 1.

The optical system 21 condenses light from a predetermined visual field area, and forms an image of the condensed light on an imaging surface of an imaging device (not shown) constituting the imaging unit 26. The optical system 21 includes a zoom lens 211 and a focus lens 212 as illustrated in FIG. 2.

The zoom lens 211 is constituted by one or a plurality of lenses, and shifts along an optical axis indicated by a broken line in FIG. 2 to change zoom magnification of the optical system 21.

The focus lens 212 is constituted by one or a plurality of lenses, and shifts along the optical axis indicated by the broken line in FIG. 2 to change a focal position and a focal distance of the optical system 21.

The driving unit 22 moves the respective lenses 211 and 212 constituting the optical system 21 along the optical axis under control by the camera-side controller 30. As illustrated in FIG. 2, the driving unit 22 includes a zoom driving unit 221 and a focus driving unit 222.

The zoom driving unit 221 is constituted by a stepping motor or a DC motor, for example, and moves the zoom lens 211 along the optical axis.

The focus driving unit 222 is constituted by a stepping motor or a DC motor, for example, and moves the focus lens 212 along the optical axis.

The position detector 23 detects positions of the respective lenses 211 and 212 constituting the optical system 21 on the optical axis. The position detector 23 includes a zoom position detector 231 and a focus position detector 232 as illustrated in FIG. 2.

The zoom position detector 231 is constituted by a photo-interrupter or the like, and detects a position of the zoom lens 211 on the optical axis shifted by the zoom driving unit 221.

More specifically, the zoom position detector 231 converts an amount of rotation of a driving motor contained in the zoom driving unit 221 into a pulse number, and detects the position of the zoom lens 211 on the optical axis from an infinity-based reference position based on the converted pulse number.

The focus position detector 232 is constituted by a photo-interrupter or the like, and detects a position of the focus lens 212 on the optical axis shifted by the focus driving unit 222 by a method similar to the method of the zoom position detector 231.

The operating unit 24 is constituted by an operation ring provided on a circumference of the lens barrel 20, or buttons or switches provided on an outer surface of the lens barrel 20. The operating unit 24 receives user operations such as a start/end operation of the lens-type camera 2 (on/off operation of the lens-type camera 2), a position change operation for changing positions of the zoom lens 211 and the focus lens 212 on the optical axis within the optical system 21, an capturing operation, and a communication end operation for ending communication with the communication device 3. The operating unit 24 having received these operations outputs signals corresponding to the user operations to the camera-side controller 30.

The clock unit 25 has a time measuring function, and further has a function of generating date and time information (hereinafter referred to as time stamp) concerning date and time of imaging executed by the imaging unit 26. The time stamp generated by the clock unit 25 is output to the camera-side controller 30.

Needless to say, precise time adjustment by the device is not needed for generation of a time stamp. A time stamp may be acquired through communication with other devices at the time of capturing in another application example.

The imaging unit 26 generates image data by imaging a subject under control by the camera-side controller 30. The imaging unit 26 is constituted by an imaging device such as a CCD (Charge Coupled Device) which receives an image of a subject formed by the optical system 21 and converts the image into an electric signal, a signal processing unit which generates digital image data by performing signal processing (e.g., A/D conversion) for the electric signals (analog signals) received from the imaging device, and other components. Image data sequentially generated by the imaging unit 26 (hereinafter referred to as live-view image data) is sequentially stored in the camera-side memory unit 27 under control by the camera-side controller 30, in a state that a time stamp concerning date and time and the like of generation of live-view image data has been added to the corresponding live-view image data. On the other hand, image data generated by the imaging unit 26 in accordance with an capturing operation input to the lens-type camera 2 (operating unit 24) or the communication device 3 by the camera user (this data is hereinafter referred to as capturing image data) is stored in the camera-side recording unit 28, in a state that a time stamp concerning date and time of generation of capturing image data has been added to the corresponding capturing image data.

The camera-side memory unit 27 sequentially stores live-view image data (including time stamp) generated by the imaging unit 26.

The camera-side recording unit 28 records various types of programs executed by the camera-side controller 30, and characteristic information concerning characteristics of the optical system 21, such as magnification, focal distance, angle of view, aberration, and F-number (brightness) of the optical system 21, for example. The camera-side recording unit 28 further records capturing image data (including time stamp) generated by the imaging unit 26 in accordance with an capturing operation input to the lens-type camera 2 (operating unit 24) or the communication device 3 by the camera user under control by the camera-side controller 30.

The camera-side communication unit 29 functions as a first communication unit according to the present invention. The camera-side communication unit 29 also functions as a communication interface for realizing wireless communication of various types of data including signals necessary for communication with the communication device 3 by using any one of first through nth communication channels under control by the camera-side controller 30.

FIGS. 1 and 2 illustrate only the single communication device 3 for convenience of explanation. However, the camera-side communication unit 29 is configured to establish communication connection with the plurality of communication devices 3 as well as communication connection with only the single communication device 3.

According to the first embodiment, Wi-Fi (Wireless Fidelity) (registered trademark) is adopted as a communication system of the wireless communication. Communication systems other than Wi-Fi (registered trademark), such as WiMAX (Worldwide Interoperability for Microwave Access) (registered trademark), may be adopted as the communication system of the wireless communication.

In case of Wi-Fi (registered trademark), for example, the device functions exhibit a relation of an access point and a station on an assumed local network. A general connection process is realized when the station connects with a wireless network constituted by the access point.

Connection sequences are roughly divided into Steps 1 and 2. More specifically, the access point gives notification indicating a network identifier (SSID) of the access point by using any one of the first through nth communication channels (Step 1). Then, the station searches the communication channel through which the notification of the network identifier (SSID) has been given from the first through nth communication channels, and connects with the access point by using the selected communication channel based on the search (Step 2). In this example, the lens-type camera 2 corresponds to the access point, while the communication device 3 corresponds to the station. According to this communication system, communication is allowed at a speed of 10 megabits per second or higher. Accordingly, images are transmittable at a high speed.

The camera-side controller 30 includes a CPU (Central Process Unit) and others, and controls the overall operation of the lens-type camera 2 in accordance with signals received from the operating unit 24, and signals received from the communication device 3 via the camera-side communication unit 29. The camera-side controller 30 includes a communication state determination unit 301, a mode switching unit 302, a communication controller 303, and an imaging controller 304 as illustrated in FIG. 2.

The communication state determination unit 301 determines whether or not a communication state is preferable for each of the first through nth communication channels, or for the communication channel currently used.

More specifically, the communication state determination unit 301 detects a state of use by other devices for each of the first through nth communication channels before a start of a communication connection establishment process. Then, the communication state determination unit 301 determines a communication channel not used by other devices, or a communication channel used by a relatively small number of devices in comparison with other communication channels, as a communication channel in a preferable communication state.

The communication state determination unit 301 further detects a throughput of the communication channel currently used after the communication connection establishment process. When the throughput is a predetermined value or larger, the communication state determination unit 301 determines that the communication state of the corresponding communication channel is preferable. On the other hand, when the throughput is smaller than the predetermined value, the communication state determination unit 301 determines that the communication state of the corresponding communication channel is not preferable.

The communication state determination unit 301 further determines that the communication state of the communication channel is not preferable when communication connection is difficult to establish in a state that an authentication request does not reach a destination device, or that a response to an authentication request does not reach the device even after arrival of the request at the destination device, for example, during the communication connection establishment process.

The mode switching unit 302 switches a communication mode of the lens-type camera 2 to a stable communication mode or a connection priority communication mode.

The stable communication mode in this context is a communication mode for establishing communication connection with the communication device 3 by using a communication channel in a preferable communication state (hereinafter referred to as state preferable channel) in the first through nth communication channels in accordance with a determination result obtained by the communication state determination unit 301.

On the other hand, the connection priority communication mode is a communication mode for establishing communication connection with the communication device 3 by using a communication channel selected beforehand (hereinafter referred to as default channel) from the first through nth communication channels without determination by the communication state determination unit 301.

The communication controller 303 starts (establishes) communication connection with the communication device 3 via the camera-side communication unit 29 in the communication mode selected by the mode switching unit 302 by using a communication system such as Wi-Fi (registered trademark).

Then, the communication controller 303 receives a capturing instruction or a capturing image data transmission request from the communication device 3. The communication controller 303 transmits latest capturing image data recorded in the camera-side recording unit 28 to the communication device 3 in response to the received instruction or request. The "latest" data in this context refers to latest data in view of time and date based on the time stamp. (The same is applicable hereinafter.)

In addition, the communication controller 303 sequentially transmits latest live-view image data stored in the camera-side memory unit 27 to the communication device 3, and also transmits, to the communication device 3, characteristic information recorded in the camera-side recording unit 28, and lens position information concerning respective positions of the zoom lens 211 and the focus lens 212 detected by the position detector 23.

The communication controller 303 further receives a change instruction for changing capturing parameters from the communication device 3. The capturing parameters in this context include focal distance, focal position, F-number, shutter speed, exposure value, ISO speed, chroma, and hue, for example.

The imaging controller 304 adds a time stamp concerning time and date of generation of live-view image data to the corresponding live-view image data generated by the imaging unit 26, and sequentially stores the live-view image data in the camera-side memory unit 27. The imaging controller 304 further allows the imaging unit 26 to image a subject in accordance with an capturing operation input to the lens-type camera 2 (operating unit 24) or the communication device 3 (i.e., capturing instruction received from the communication device 3 via the camera-side communication unit 29) by the camera user. The imaging controller 304 adds a time stamp concerning time and date of generation of capturing image data to the corresponding image data generated by the imaging unit 26, and records the capturing image data in the camera-side recording unit 28. The imaging controller 304 controls operations of the driving unit 22 and the like in accordance with the change instruction for changing the capturing parameters received from the communication device 3 via the camera-side communication unit 29 to change the capturing parameters.

Configuration of Communication Device

A main part of the present invention included in a configuration of the communication device 3 is hereinafter chiefly described.

The communication device 3 is constituted by a digital camera, a digital video camera, a cellular phone, or a tablet-type portable device, for example. (An example of a cellular phone is illustrated in FIG. 2.) As illustrated in FIG. 2, the communication device 3 includes an input unit 31, a display unit 32, a device-side memory unit 33, a device-side recording unit 34, a device-side communication unit 35, and a device-side controller 36.

The input unit 31 is constituted by buttons, switches, a touch panel or the like, and outputs instruction signals corresponding to the user operations to the device-side controller 36.

The input unit 31 functions as an operation receiving unit according to the present invention.

The display unit 32 is constituted by a liquid crystal or organic EL (Electro Luminescence) display panel, for example. The display unit 32 displays a predetermined image under control by the device-side controller 36.

The device-side memory unit 33 stores live-view image data (including time stamp), characteristic information, lens position information and others received from the lens-type camera 2 via the device-side communication unit 35.

The device-side recording unit 34 records various types of programs (including communication connection program according to the present invention) executed by the device-side controller 36, and various types of data used during execution of the programs, and others, and records capturing image data (including time stamp) received from the lens-type camera 2 via the device-side communication unit 35.

The device-side communication unit 35 is a communication interface provided for wireless communication of various types of data including signals necessary for communication with the lens-type camera 2 via any one of the first through nth communication channels by using a communication system such as Wi-Fi (registered trademark) under control by the device-side controller 36.

The device-side controller 36 is constituted by a CPU and others, and controls overall operations of the communication device 3 by issuing instructions and transferring data to respective units constituting the communication device 3 in accordance with instruction signals received from the input unit 31.

Operation of Communication System

Operations of the communication system 1 discussed above are hereinafter described.

An operation of the lens-type camera 2 (communication connection method according to the present invention), and an operation of the communication device 3 are sequentially described in this order as the operations of the communication system 1.

Operation of Lens-type Camera

Figure 3:
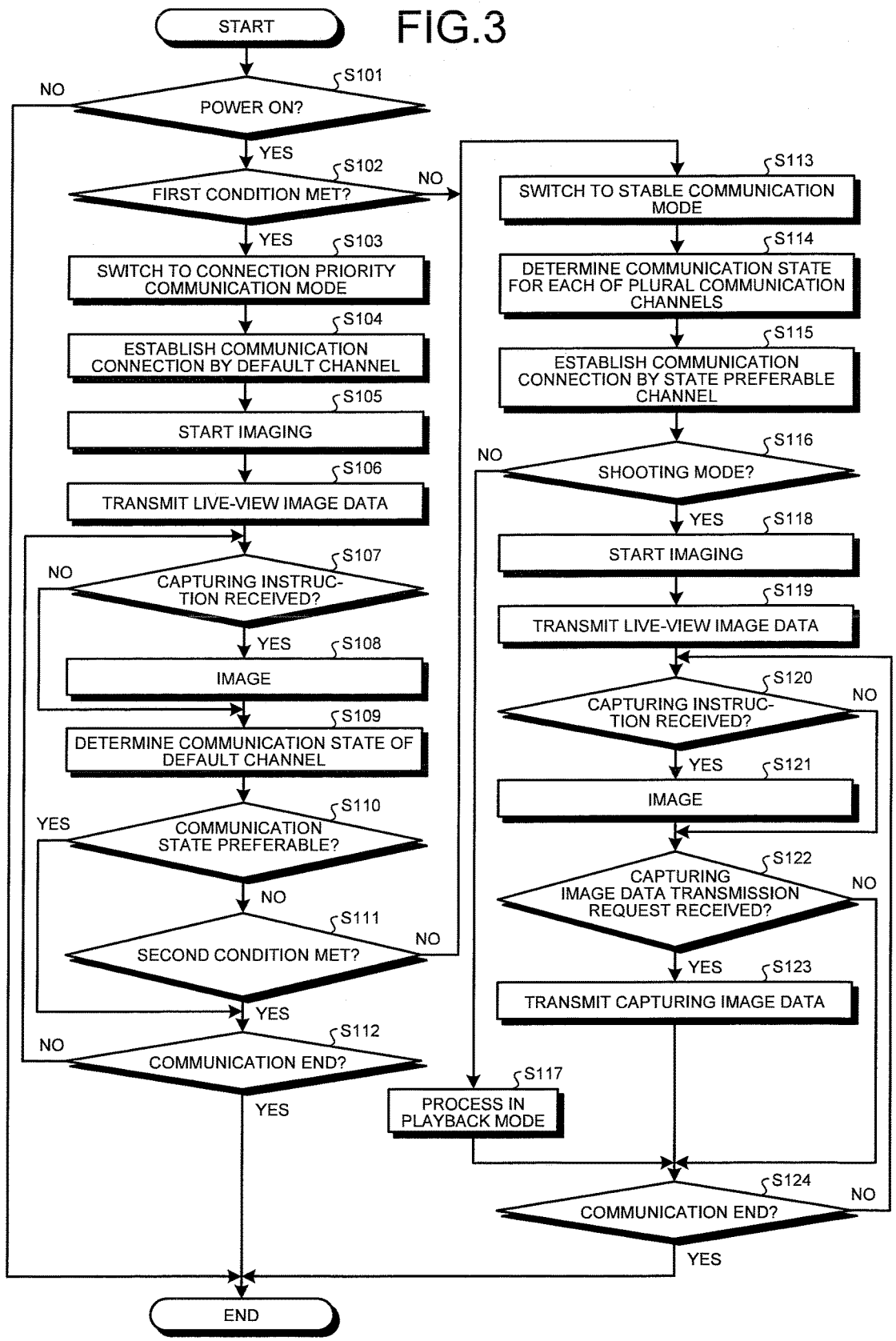
FIG. 3 is a flowchart illustrating an operation of a lens-type camera illustrated in FIGS. 1 and 2.

FIG. 3 is a flowchart illustrating the operation of the lens-type camera 2.

When the power of the lens-type camera 2 is turned on in response to a starting operation input to the operating unit 24 by the camera user (step S101: Yes), the mode switching unit 302 determines whether or not a first condition is met (step S102).

The "first condition" in this context is a condition that the lens-type camera 2 is set to the shooting mode (mode for capturing a still image or the like). More specifically, the mode switching unit 302 determines that the first condition is met when the lens-type camera 2 is set to the shooting mode. On the other hand, the mode switching unit 302 determines that the first condition is not met when the lens-type camera 2 is set to not the shooting mode but a playback mode (mode for transmitting capturing image data recorded in the camera-side recording unit 28 to the communication device 3).

When it is determined that the first condition is met (step S102: Yes), the mode switching unit 302 switches the communication mode of the lens-type camera 2 to the connection priority communication mode (step S103: mode switching step).

When it is determined that the first condition is not met (step S102: No), the lens-type camera 2 shifts to step S113.

After step S103, the communication controller 303 gives notification of a network identifier (SSID) via the camera-side communication unit 29 by using a default channel (such as first communication channel) in the first through nth communication channels to start (establish) communication connection with the communication device(s) 3 (only single communication device 3 or the plurality of communication devices 3) by using the default channel (step S104: communication control step).

Then, the camera-side controller 30 executes setups of the optical system 21 (such as positioning of the zoom lens 211 and focus lens 212 at initial positions on the optical axis) to shift to an imaging-enabled state, and allows the imaging unit 26 to start imaging (step S105). Live-view image data (including time stamp) generated by the imaging unit 26 is sequentially stored in the camera-side memory unit 27. The process in step S105 may be executed only when "Yes" in step S107. In addition, the time stamp need not be included in the live-view image data.

Subsequently, the communication controller 303 transmits latest live-view image data (including time stamp) stored in the camera-side memory unit 27 to the communication device(s) 3 (only single communication device 3 when communication connection is established only with the single communication device 3, or the plurality of communication devices 3 when communication connection is established with the plurality of communication devices 3) via the camera-side communication unit 29 by using the default channel (step S106).

Thereafter, the imaging controller 304 determines whether or not a capturing instruction has been received from the communication device 3 via the camera-side communication unit 29 (step S107).

When it is determined that the capturing instruction has been received (step S107: Yes), the imaging controller 304 allows the imaging unit 26 to execute imaging (step S108). Capturing image data generated by the imaging unit 26 (including time stamp) is recorded in the camera-side recording unit 28.

When it is determined that the capturing instruction has not been received (step S107: No), the lens-type camera 2 shifts to step S109.

When it is determined that the capturing instruction has not been received after step S108 or in step S107 (step S107: No), the communication state determination unit 301 determines whether or not the communication state of the default channel is preferable (step S109).

When it is determined that the communication state of the default channel is preferable in step S109 (step S110: Yes), the lens-type camera 2 shifts to step S112.

When it is determined that the communication state of the default channel is not preferable in step S109 (step S110: No), the mode switching unit 302 determines whether or not a second condition is met (step S111).

The "second condition" in this context is a condition that communication connection is established between the lens-type camera 2 and the plurality of communication devices 3 by using the default channel. More specifically, the mode switching unit 302 determines that the second condition is met when the communication connection is established with the plurality of communication devices 3 by using the default channel in step S104. On the other hand, the mode switching unit 302 determines that the second condition is not met when the communication connection is established only with the single communication device 3 by using the default channel in step S104.

When it is determined that the second condition is met (step S111: Yes), the mode switching unit 302 does not switch the communication mode of the lens-type camera 2, but continues the connection priority communication mode. Then, the camera-side controller 30 determines whether or not a communication end operation has been input to the operating unit 24 by the camera user (step S112). When it is determined that the communication state of the default channel is preferable in step S109 (step S110: Yes), step S112 is similarly executed.

When it is determined that the communication end operation has been input (step S112: Yes), the lens-type camera 2 ends this process.

When it is determined that the communication end operation has not been input (step S112: No), the lens-type camera 2 returns to step S107.

In FIG. 3, steps S107 through S112 are executed after steps S105 and S106 for convenience of explanation. However, steps S105 and S106 and steps S107 through S112 are simultaneously executed in parallel in a practical situation.

When it is determined that the second condition is not met in step S111 (step S111: No), or when it is determined that the first condition is not met in step S102 (step S102: No), the mode switching unit 302 switches the communication mode of the lens-type camera 2 to the stable communication mode (step S113: mode switching step).

Then, the communication state determination unit 301 determines whether or not the communication state of the communication channel is preferable for each of the first through nth communication channels (step S114). The communication controller 303 may end communication connection with the communication device(s) 3 before determining the communication state.

Subsequently, the communication controller 303 gives notification of the network identifier (SSID) via the camera-side communication unit 29 by using a state preferable channel exhibiting a preferable communication state in the first through nth communication channels, and starts (establishes) communication connection with the communication device(s) 3 (the single communication device 3 or the plurality of communication devices 3) (step S115: communication control step).

Thereafter, the camera-side controller 30 determines whether or not the lens-type camera 2 is set to the shooting mode (step S116).

When it is determined that the lens-type camera 2 is not set to the shooting mode in step S116 (step S116: No), the camera-side controller 30 executes a process in the playback mode (step S117). Then, the lens-type camera 2 shifts to step S124.

When it is determined that the lens-type camera 2 is set to the shooting mode in step S116 (step S116: Yes), the camera-side controller 30 executes steps S118 through S121 similar to steps S105 through S108.

When it is determined that the capturing instruction has not been received after step S121 or in step S120 (step S120: No), the communication controller 303 determines whether or not an capturing image data transmission request has been received from the communication device 3 via the camera-side communication unit 29 by using the state preferable channel (step S122).

When it is determined that the capturing image data transmission request has not been received (step S122: No), the lens-type camera 2 shifts to step S124.

When it is determined that the capturing image data transmission request has been received (step S122: Yes), the communication controller 303 transmits latest capturing image data recorded in the camera-side recording unit 28 to the communication device 3 (communication device 3 having transmitted the capturing image data transmission request) via the camera-side communication unit 29 by using the state preferable channel (step S123). Then, the lens-type camera 2 shifts to step S124.

According to the above description and depiction in FIG. 3, steps S122 and S123 are executed only in the stable communication mode. However, steps similar to steps S122 and S123 may be executed in the connection priority communication mode as well. In this case, capturing image data is transmitted to the communication device 3 by using the default channel in the step similar to step S123.

When it is determined that the capturing image data transmission request has not been received after step S117 or in step S122 (step S122: No), or after step S123, the camera-side controller 30 determines whether or not the communication end operation has been input to the operating unit 24 by the camera user (step S124).

When it is determined that the communication end operation has been input in step S124 (step S124: Yes), the lens-type camera 2 ends this process.

When it is determined that the communication end operation has not been input in step S124 (step S124: No), the lens-type camera 2 returns to step S120.

According to FIG. 3, steps S120 through S124 are executed after steps S118 and S119 for convenience of explanation. However, steps S118 and S119 and steps S120 through S124 are simultaneously executed in parallel in a practical situation.

Operation of Communication Device

The operation of the communication device 3 is hereinafter described.

Figure 4:
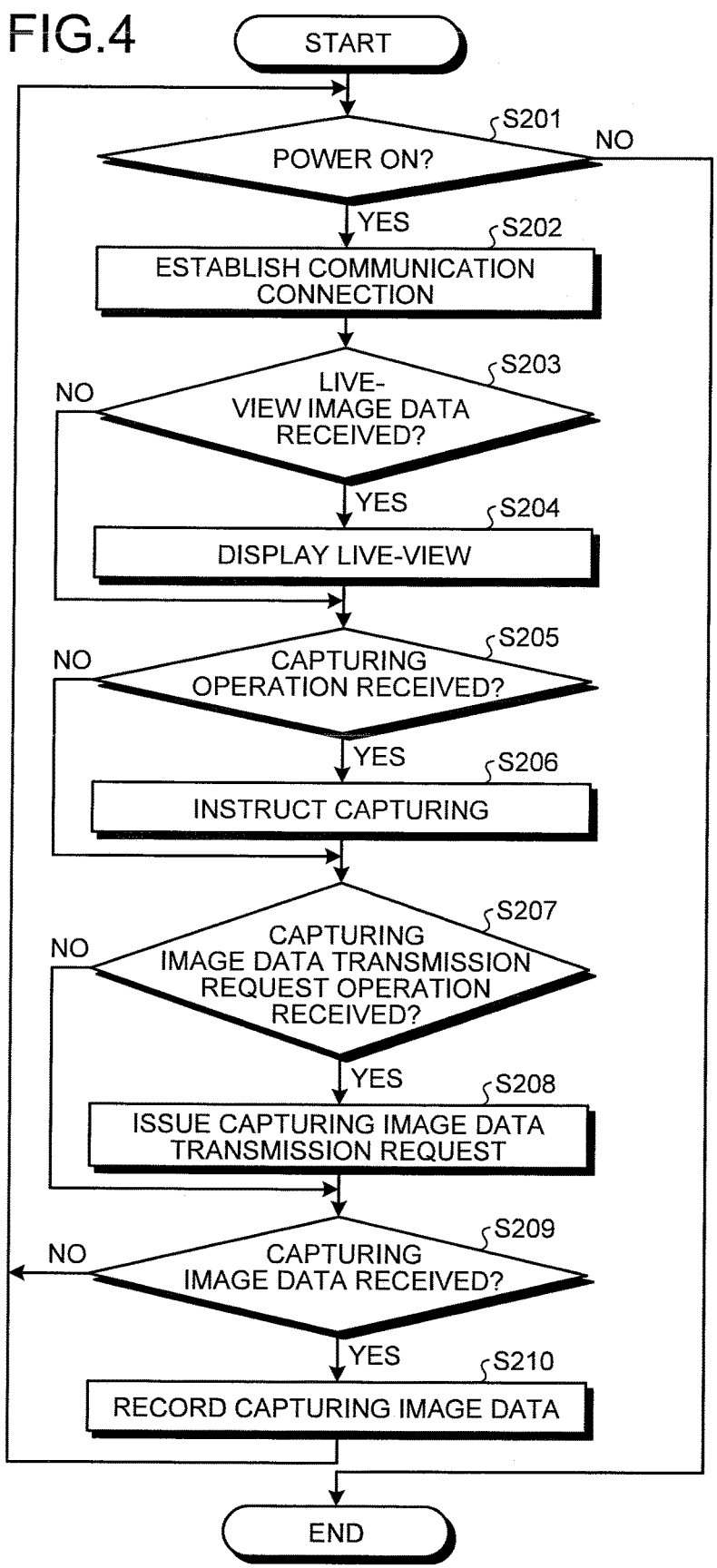
FIG. 4 is a flowchart illustrating an operation of a communication device illustrated in FIGS. 1 and 2.

FIG. 4 is a flowchart illustrating the operation of the communication device 3.

When the power of the communication device 3 is turned on in response to an operation input to the input unit 31 by the camera user (step S201: Yes), the device-side controller 36 searches the communication channel through which the notification of the network identifier (SSID) has been given in the first through nth communication channels via the device-side communication unit 35, and establishes communication connection with the lens-type camera 2 by using the corresponding communication channel (step S202).

Then, the device-side controller 36 determines whether or not live-view image data (including time stamp) has been received from the lens-type camera 2 via the device-side communication unit 35 (step S203).

When it is determined that live-view image data has not been received (step S203: No), the communication device 3 shifts to step S205.

When it is determined that live-view image data has been received (step S203: Yes), the device-side controller 36 stores the received live-view image data in the device-side memory unit 33. Then, the device-side controller 36 displays, on the display unit 32, a live-view image corresponding to the latest live-view image data stored in the device-side memory unit 33 (live-view display) (step S204).

When it is determined that live-view image data has not been received after step S204 or in step S203 (step S203: No), the device-side controller 36 determines whether or not a capturing operation (operation for allowing the lens-type camera 2 to capture) has been input to the input unit 31 by the camera user (step S205).

When it is determined that the capturing operation has not been input (step S205: No), the communication device 3 shifts to step S207.

When it is determined that the capturing operation has been input (step S205: Yes), the device-side controller 36 transmits a capturing instruction (instruction for allowing the lens-type camera 2 to capture) to the lens-type camera 2 via the device-side communication unit 35 (step S206).

When it is determined that the capturing operation has not been input after step S206 or in step S205 (step S205: No), the device-side controller 36 determines whether or not an capturing image data transmission request operation (operation for issuing capturing image data transmission request to the lens-type camera 2) has been input to the input unit 31 by the camera user (step S207).

When it is determined that the capturing image data transmission request operation has not been input (step S207: No), the communication device 3 shifts to step S209.

When it is determined that the capturing image data transmission request operation has been input (step S207: Yes), the device-side controller 36 transmits the capturing image data transmission request to the lens-type camera 2 via the device-side communication unit 35 (step S208).

When it is determined that the capturing image data transmission request operation has not been input after step S208 or in step S207 (step S207: No), the device-side controller 36 determines whether or not capturing image data (including time stamp) has been received from the lens-type camera 2 via the device-side communication unit 35 (step S209).

When it is determined that capturing image data has not been received (step S209: No), the communication device 3 returns to step S201.

When it is determined that capturing image data has been received (step S209: Yes), the device-side controller 36 records the received capturing image data in the device-side recording unit 34 (step S210). Thereafter, the communication device 3 returns to step S201.

According to the lens-type camera 2 of the first embodiment described above, the communication mode of the lens-type camera 2 is switchable between the stable communication mode and the connection priority communication mode. The lens-type camera 2 starts communication connection with the communication device 3 in the selected communication mode.

In this case, determination of a communication state for each of the first through nth communication channels is not made when communication connection is established with the communication device 3 in the connection priority communication mode. Accordingly, in the connection priority communication mode, the lens-type camera 2 immediately establishes communication connection with the communication device 3 by using the default channel in response to power-on. This structure allows the camera user to immediately capture a subject while checking a live-view image displayed on the communication device 3 after power-on of the lens-type camera 2, thereby reducing missing of precious moment for releasing the shutter.

Accordingly, the lens-type camera 2 of the first embodiment offers an advantage of enhanced convenience.

Moreover, the lens-type camera 2 according to the first embodiment sets such a condition that the lens-type camera 2 is set to the shooting mode as the first condition to be determined immediately after power-on.

In this case, the camera user is allowed to immediately capture a subject by using communication between the lens-type camera 2 and the communication device 3 when the lens-type camera 2 is set to the shooting mode. On the other hand, the camera user is allowed to playback previously obtained capturing image data in a stable condition via communication connection established between the lens-type camera 2 and the communication device 3 by using a state preferable channel in a preferable communication state when the lens-type camera 2 is set to the playback mode.

When the default channel is not in a preferable communication state and thus switched to another communication channel in a state that communication connection is established between the lens-type camera 2 and the plurality of communication devices 3 in the connection priority communication mode, this switching cuts off communication with all the communication devices 3. For example, when communication between the lens-type camera 2 and all the communication devices 3 is cut off in a state that capturing image data is transmitted from the lens-type camera 2 to one of the plurality of communication devices 3, the corresponding capturing image data may be damaged. In this case, the communication device 3 is difficult to receive the corresponding capturing image data. In other words, stable communication is difficult to realize between the lens-type camera 2 and the plurality of communication devices 3 in a stable condition.

However, the lens-type camera 2 according to the first embodiment determines whether or not the second condition (establishment of communication connection with the plurality of communication devices 3) is met when it is determined that the communication state of the default channel is not preferable after establishment of communication connection between the lens-type camera 2 and the communication device 3 in the connection priority communication mode. When it is determined that the second condition is met, the lens-type camera 2 continues the connection priority communication mode. When it is determined that the second condition is not met, the lens-type camera 2 switches the communication mode to the stable communication mode. In this case, the lens-type camera 2 continues communication with the plurality of communication devices 3 by using the default channel without switching the communication channel even when the communication state of the default channel is not preferable after establishment of communication connection with the plurality of communication devices 3. Accordingly, situations discussed above such as damages to the capturing image data or the like are not caused, wherefore stable communication is realizable between the lens-type camera 2 and the plurality of communication devices 3.

Modified Example of First Embodiment

According to the first embodiment described above, the lens-type camera 2 switches the communication mode of the lens-type camera 2 to the connection priority communication mode when it is determined the lens-type camera 2 is set to the shooting mode immediately after power-on. However, other configurations may be adopted. For example, the lens-type camera 2 may be configured to switch the communication mode to the connection priority communication mode even in a state that the lens-type camera 2 is set to the playback mode. More specifically, the lens-type camera 2 may be configured to switch the communication mode to the connection priority mode without determination of the first condition in response to power-on.

According to the first embodiment described above, steps similar to steps S109, S111, and S113 may be added to the process flow of steps S122 through S124, similarly to the process flow of steps S109 through S112.

Second Embodiment

A second embodiment according to the present invention is hereinafter described.

In the following description, configurations and steps similar to the corresponding configurations and steps in the foregoing first embodiment have been given similar reference numbers, and detailed description of these configurations and steps is omitted or only briefly presented.

A communication system according to the second embodiment is different from the communication system 1 described in the foregoing first embodiment in that communication between a lens-type camera and a communication device is connected by using two different communication systems for each.

A configuration of the communication system according to the second embodiment is hereinafter described.
Configuration of Communication System FIG. 5 is a block diagram illustrating a configuration of a communication system 1A according to the second embodiment of the present invention.

A configuration of a lens-type camera 2A and a configuration of a communication device 3A, both constituting the communication system 1A according to the second embodiment, are described in this order.

Figure 5:
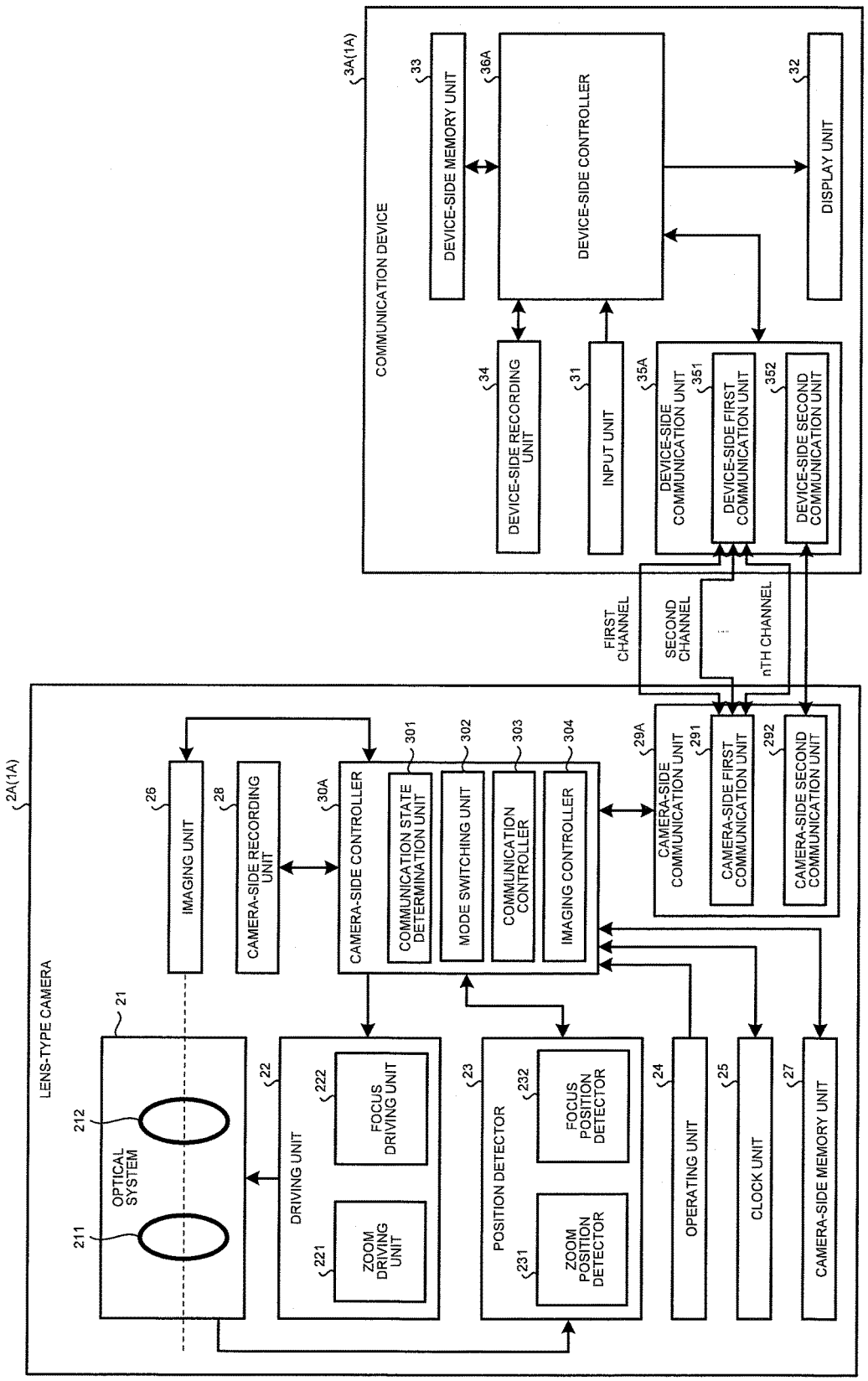
FIG. 5 is a block diagram illustrating a communication system according to a second embodiment of the present invention.

As illustrated in FIG. 5, the lens-type camera 2A according to the second embodiment adopts a camera-side communication unit 29A in place of the camera-side communication unit 29 included in the lens-type camera 2 (FIG. 2) described in the foregoing first embodiment. In addition, the lens-type camera 2A adopts a camera-side controller 30A in place of the camera-side controller 30 in accordance with adoption of the camera-side communication unit 29A.

As illustrated in FIG. 5, the camera-side communication unit 29A includes a camera-side first communication unit 291, and a camera-side second communication unit 292.

The camera-side first communication unit 291 functions as the first communication unit according to the present invention, and has a configuration similar to the configuration of the camera-side communication unit 29 described in the foregoing first embodiment.

The camera-side second communication unit 292 functions as a second communication unit according to the present invention. The camera-side second communication unit 292 is a communication interface provided for communication with the communication device 3A by using a communication system (hereinafter referred to as second communication) different from a communication system (hereinafter referred to as first communication) adopted by the camera-side first communication unit 291 under control by the camera-side controller 30A.

According to the second embodiment, Bluetooth (registered trademark) including Bluetooth (registered trademark) Low Energy is employed as the second communication. Communication systems other than Bluetooth (registered trademark), such as NFC (Near Field Communication), may be employed as the second communication.

In case of Bluetooth (registered trademark), for example, the device functions exhibit a relation of a master and a slave with a near-distance one-to-one correspondence. A general connection process is realized when the master searches a desired slave and connects with the slave. Accordingly, communication is established in a simple manner only requiring a relation of an inquiry and a response.

Connection sequences are roughly divided into Steps 1 through 3. More specifically, the master issues an inquiry about the presence or absence of slaves (Step 1). Then, each of the slaves gives a response to the inquiry received from the master (Step S2). Thereafter, the master connects with a desired slave in the slaves having responded (Step S3). In this example, the communication device 3A corresponds to the master, while the lens-type camera 2A corresponds to the slave. This communication system has a communication speed approximately in a range from several hundred kilobits to the maximum 2 megabits per second, and thus is not appropriate for transmission of an image (particularly for transmission of a moving image).

Processing functions of the camera-side controller 30A (such as timing for processing by the communication state determination unit 301 and condition and timing for switching communication mode by the mode switching unit 302) are changed from the corresponding processing functions of the camera-side controller 30 described in the foregoing first embodiment in accordance with adoption of the camera-side first and second communication units 291 and 292.

As illustrated in FIG. 5, the communication device 3A according to the second embodiment adopts a device-side communication unit 35A in place of the device-side communication unit 35 of the communication device 3 (FIG. 2) described in the foregoing first embodiment. In addition, the communication device 3A adopts a device-side controller 36A in place of the device-side controller 36 in accordance with adoption of the device-side communication unit 35A.

As illustrated in FIG. 5, the device-side communication unit 35A includes a device-side first communication unit 351 and a device-side second communication unit 352.

A configuration of the device-side first communication unit 351 is similar to the configuration of the device-side communication unit 35 described in the foregoing first embodiment.

The device-side second communication unit 352 is a communication interface provided for communication with the lens-type camera 2A by using the second communication such as Bluetooth (registered trademark) under control by the device-side controller 36A.

Processing functions of the device-side controller 36A are changed from the processing functions of the device-side controller 36 described in the foregoing first embodiment in accordance with adoption of the device side first and second communication units 351 and 352.

Operation of Communication System

Operations of the communication system 1A according to the second embodiment are hereinafter described.

An operation of the lens-type camera 2A (communication connection method according to the present invention), and an operation of the communication device 3A are described in this order as the operations of the communication system 1A.

Operation of Lens-Type Camera

Figure 6:
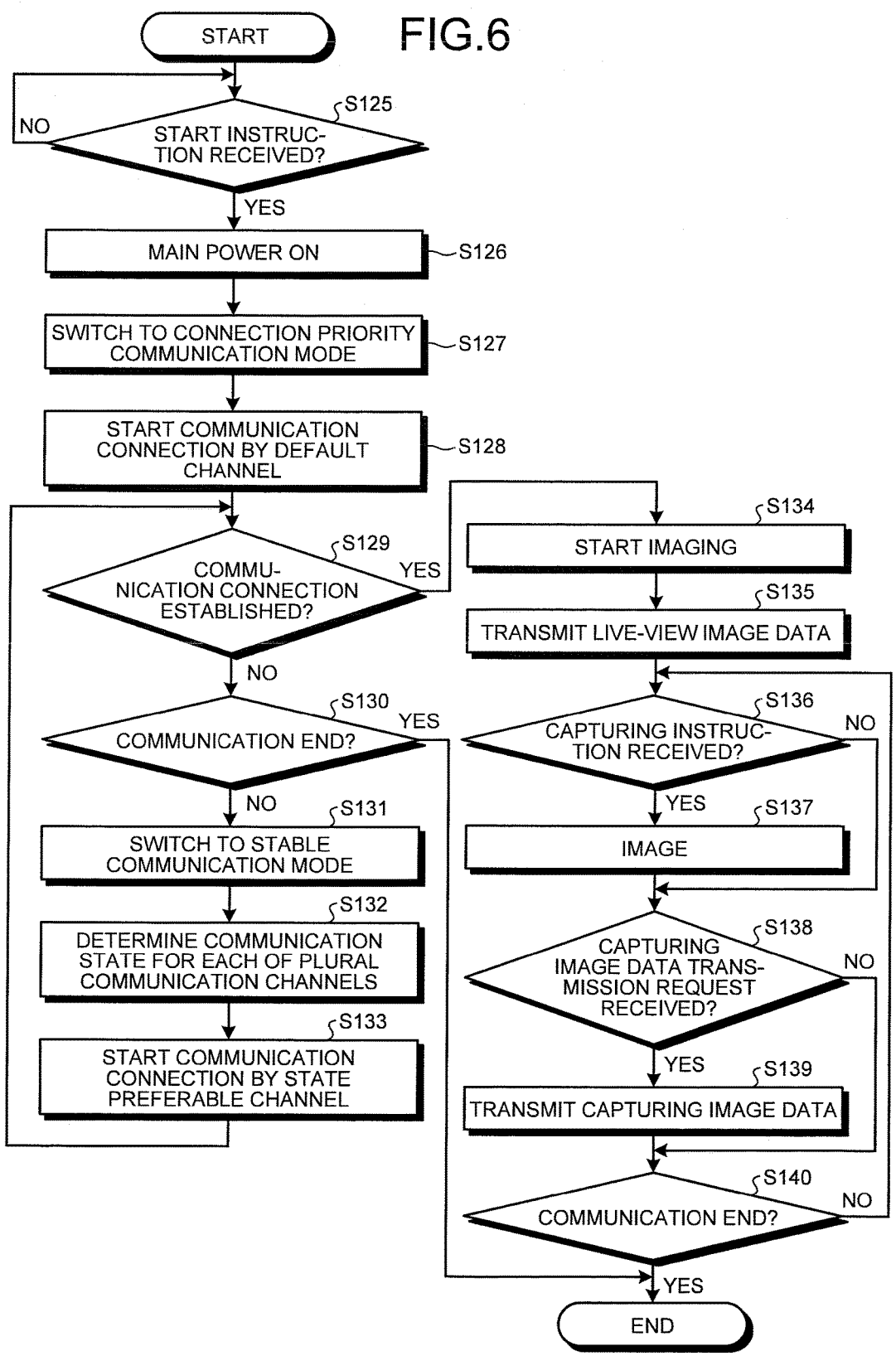
FIG. 6 is a flowchart illustrating an operation of a lens-type camera illustrated in FIG. 5.

FIG. 6 is a flowchart illustrating the operation of the lens-type camera 2A.

The lens-type camera 2A includes a main power source (not shown) and a sub power source (not shown) as power sources to supply power for operating respective components of the lens-type camera 2A. It is assumed that the following process starts in a main power source OFF state and a sub power source ON state, i.e., in a state that power is supplied from the sub power source only to the camera-side controller 30A and the camera-side second communication unit 292.

A dedicated controller may be provided on the camera-side second communication unit 292. This structure supplies power from the sub power source only to the camera-side second communication unit 292 to shift to a standby state, thereby realizing energy saving design.

Initially, the communication controller 303 constantly monitors whether or not a start instruction (instruction for turning on the main power source for startup of the lens-type camera 2A, and setting the lens-type camera 2A to the shooting mode) has been received from the communication device 3A via the camera-side second communication unit 292 by using the second communication (step S125).

When it is determined that the start instruction has been received (step S125: Yes), the camera-side controller 30A turns on the main power source to supply power to the respective components of the lens-type camera 2A, and sets the lens-type camera 2A to the shooting mode (step S126).

Then, the mode switching unit 302 switches the communication mode of the lens-type camera 2A to the connection priority communication mode (step S127: mode switching step).

More specifically, according to the second embodiment, the mode switching unit 302 sets the communication mode of the lens-type camera 2A to the connection priority communication mode in a state that the start instruction has been received from the communication device 3A by the second communication, unlike the foregoing first embodiment.

Subsequently, the communication controller 303 gives notification of a network identifier (SSID) via the camera-side first communication unit 291 by using a default channel (e.g., first communication channel) of the first through nth communication channels to start communication connection with the communication device 3A by using the default channel (step S128: communication control step).

Thereafter, the communication state determination unit 301 determines, via the camera-side first communication unit 291, whether or not communication connection has been established at the time of a communication connection establishment process with the communication device 3A (such as authentication, connection, and encryption key exchange) (step S129).

When it is determined that communication connection has been established with the communication device 3A (step S129: Yes), the lens-type camera 2A shifts to step S134.

When it is determined that communication connection is difficult to establish with the communication device 3A (step S129: No), the communication controller 303 determines whether to end communication with the communication device 3A (step S130).

For example, the communication controller 303 determines that that communication with the communication device 3A is to end when communication connection is difficult to establish even after trial of communication connection between the communication device 3A and all of the first though nth communication channel selected one by one in following step S133. On the other hand, the communication controller 303 determines that communication with the communication device 3A is not to end when trial of communication connection between the communication device 3A and all of the first though nth communication channel selected one by one in step S133 is not completed.

When it is determined that communication with the communication device 3A is to end (step S130: Yes), the lens-type camera 2A ends this process.

When it is determined that communication with the communication device 3A is not to end (step S130: No), the mode switching unit 302 switches the communication mode of the lens-type camera 2A to the stable communication mode (step S131: mode switching step).

Then, the communication state determination unit 301 determines whether or not the communication state is preferable for each of the first through nth communication channels (step S132).

Subsequently, the communication controller 303 gives notification of the network identifier (SSID) via the camera-side first communication unit 291 by using a state preferable channel in a preferable communication state in the first through nth communication channels to start communication connection with the communication device 3A by using the corresponding state preferable channel (step S133: communication control step). Thereafter, the lens-type camera 2A returns to step S129.

When it is determined that communication connection has been established with the communication device 3A in step S129 (step S129: Yes), the camera-side controller 30A executes steps S134 through S140 similar to steps S118 through S124 described in the foregoing first embodiment.

In steps S135, S136, S138, and S139, communication with the communication device 3A is realized by using the default channel when communication connection with the communication device 3A is established in the connection priority communication mode selected as the communication mode of the lens-type camera 2A. On the other hand, in these steps, communication with the communication device 3A is realized by using the state preferable channel when communication connection with the communication device 3A is established in the stable communication mode selected as the communication mode of the lens-type camera 2A.

Operation of Communication Device

Figure 7:
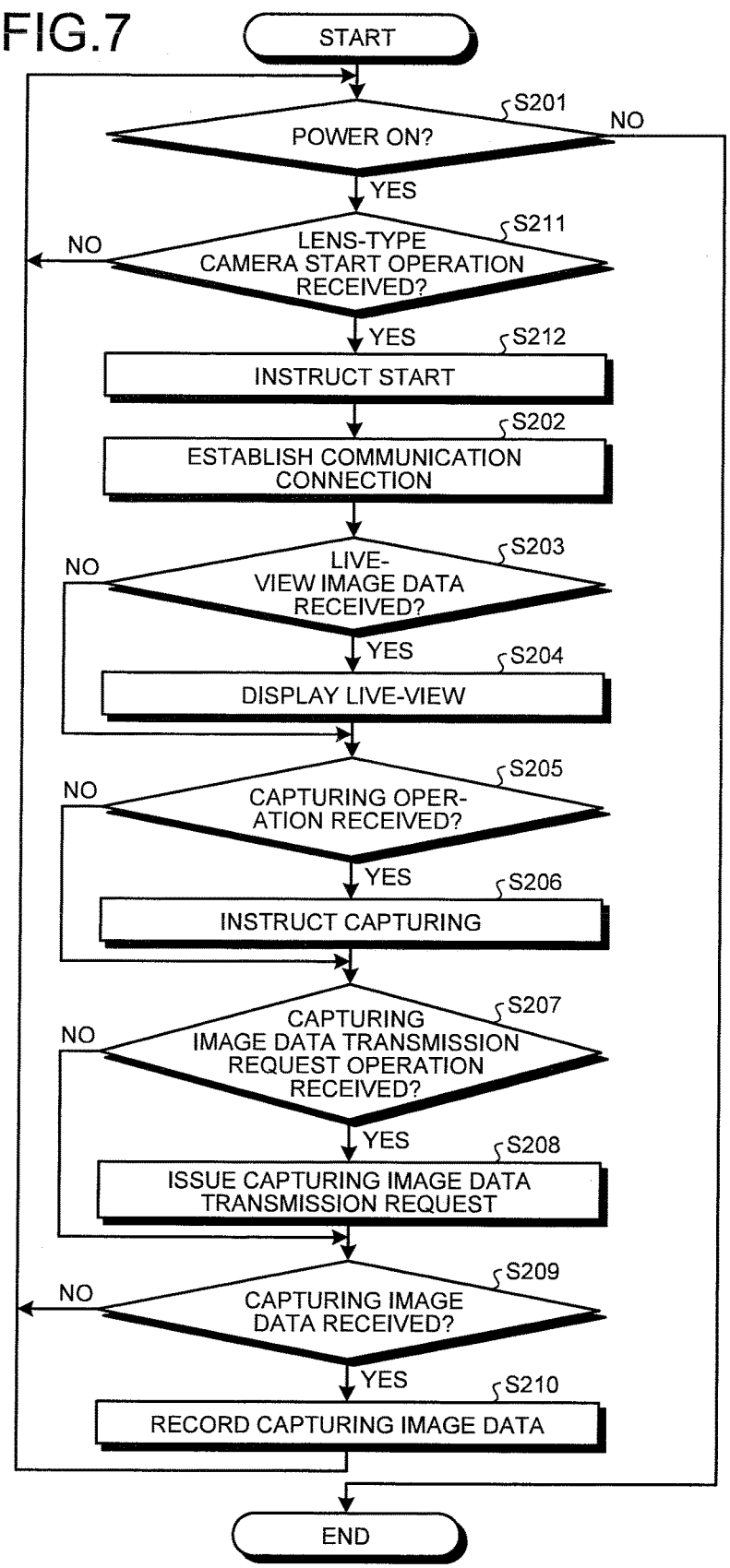
FIG. 7 is a flowchart illustrating an operation of a communication device illustrated in FIG. 5.

FIG. 7 is a flowchart illustrating the operation of the communication device 3A.

The operation of the communication device 3A according to the second embodiment is different from the operation of the communication device 3 described in the foregoing first embodiment (FIG. 4) only in that steps S211 and S212 are added. Accordingly, only steps S211 and S212 are hereinafter described as the operation of the communication device 3A.

Step S211 is executed when the power of the communication device 3A is turned on in step S201 (step S201: Yes).

More specifically, the device-side controller 36A determines whether or not a start operation of the lens-type camera 2A (operation for turning on the main power source of the lens-type camera 2A to start the lens-type camera 2A, and setting the lens-type camera 2A to the shooting mode) has been input to the input unit 31 by the camera user in step S211.

When it is determined that the start operation of the lens-type camera 2A has not been input step (S211: No), the communication device 3A returns to step S201.

When it is determined that the start operation of the lens-type camera 2A has been input (step S211: Yes), the device-side controller 36A transmits a start instruction (instruction for turning on the main power source of the lens-type camera 2A to start the lens-type camera 2A, and setting the lens-type camera 2A to the shooting mode) to the lens-type camera 2A via the device-side second communication unit 352 by using the second communication (step S212). Thereafter, the communication device 3A shifts to step S202.

According to the second embodiment, communication is realized under establishment of communication connection with the lens-type camera 2A via the device-side first communication unit 351 by using the first communication in steps S202, S203, S206, S208, and S209. However, communication with the lens-type camera 2A for purposes other than image data communication (steps S206 and S208) may be realized via the device-side second communication unit 352 by using the second communication.

According to the second embodiment described above, the following advantages are offered as well as the advantages of the foregoing first embodiment.

The lens-type camera 2A according to the second embodiment includes the camera-side first communication unit 291 for realizing the first communication such as Wi-Fi (registered trademark), and the camera-side second communication unit 292 for realizing the second communication such as Bluetooth (registered trademark). The lens-type camera 2A starts and establishes communication connection with the communication device 3A by using the default channel when receiving a start instruction from the communication device 3A via the camera-side second communication unit 292. Accordingly, the camera user is capable of starting the lens-type camera 2A only by operating the communication device 3A (input unit 31) without operating the lens-type camera 2A (operating unit 24), and promptly capturing a subject by using communication between the lens-type camera 2A and the communication device 3A.

Third Embodiment

A third embodiment according to the present invention is hereinafter described.

In the following description, configurations and steps similar to the corresponding configurations and steps in the foregoing first embodiment have been given similar reference numbers, and detailed description of these configurations and steps is omitted or only briefly presented.

A communication system according to the third embodiment is different from the communication system 1 described in the foregoing first embodiment in that a different condition is adopted as the first condition for switching the communication mode of the lens-type camera 2.

A configuration of the communication system according to the third embodiment is hereinafter described.

Figure 8:
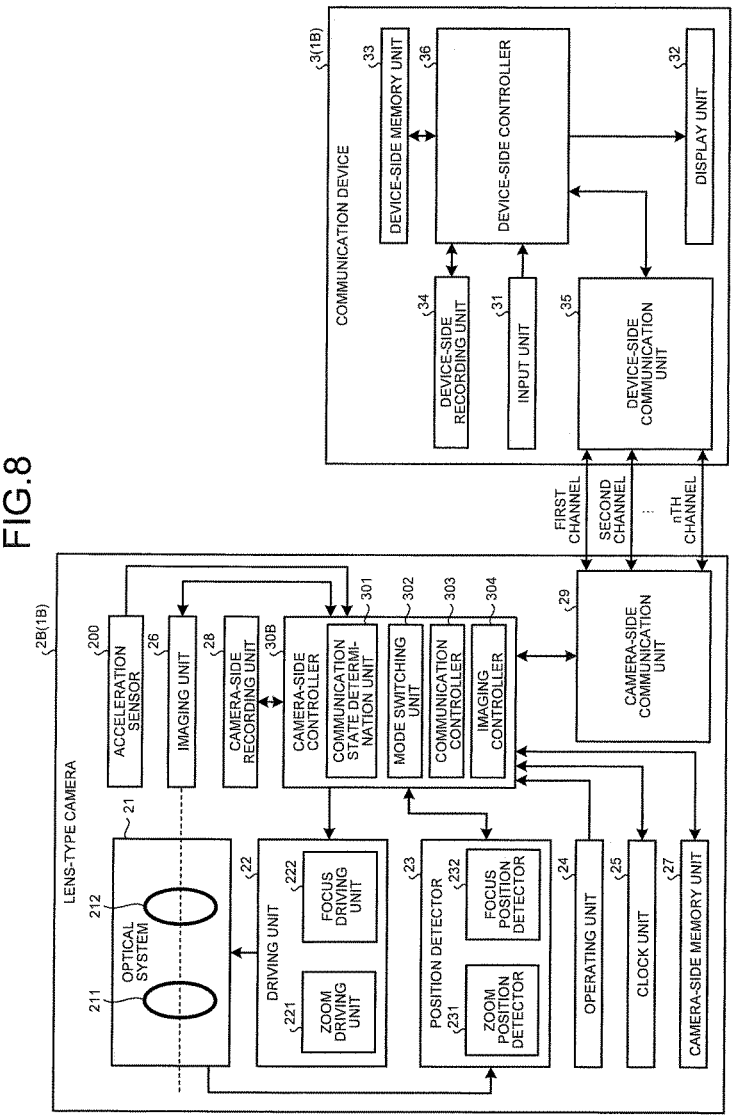
FIG. 8 is a block diagram illustrating a configuration of a communication system according to a third embodiment of the present invention.

FIG. 8 is a block diagram illustrating a configuration of a communication system 1B according to the third embodiment of the present invention.

The communication device 3 constituting the communication system 1B according to the third embodiment has a configuration similar to the configuration of the communication device 3 described in the foregoing first embodiment. Accordingly, only a lens-type camera 2B constituting the communication system 1B according to the third embodiment is hereinafter described.

As illustrated in FIG. 8, the lens-type camera 2B according to the third embodiment includes an acceleration sensor 200 in addition to the configuration of the lens-type camera 2 (FIG. 2) described in the foregoing first embodiment. The lens-type camera 2B further adopts a camera-side controller 30B in place of the camera-side controller 30 in accordance with adoption of the acceleration sensor 200.

The acceleration sensor 200 functions as an acceleration detector according to the present invention. The acceleration sensor 200 detects each of three-axis accelerations in X, Y, and Z axis directions orthogonal to each other, which accelerations are produced when the camera user moves the lens-type camera 2B. The acceleration sensor 200 outputs signals corresponding to the detected three-axis accelerations to the camera-side controller 30B.

Processing functions of the camera-side controller 30B (first condition for switching communication mode by the mode switching unit 302) are changed from the processing functions of the camera-side controller 30 described in the foregoing first embodiment in accordance with adoption of the acceleration sensor 200.

More specifically, the mode switching unit 302 adopts the following first condition as the first condition for determination in step S102 (FIG. 3).

The "first condition" according to the third embodiment is a condition that acceleration detected by the acceleration sensor 200 is predetermined threshold or higher. More specifically, when the acceleration detected by the acceleration sensor 200 is the predetermined threshold or higher, the mode switching unit 302 determines that the first condition is met (step S102: Yes). When it is determined that the acceleration detected by the acceleration sensor 200 is lower than the predetermined threshold, the mode switching unit 302 determines that the first condition is not met (step S102: No).

The operation of the lens-type camera 2B according to the third embodiment is similar to the operation of the lens-type camera 2 (FIG. 3) described in the foregoing first embodiment except for the process described above. The operation of the communication device 3 according to the third embodiment is similar to the operation of the communication device 3 (FIG. 4) described in the foregoing first embodiment.

According to the foregoing third embodiment, the following advantages are offered as well as the advantages of the foregoing first embodiment.

When prompt capturing of a subject is desired by using communication between the lens-type camera 2B and the communication device 3, the camera user may move the lens-type camera 2B at acceleration equal to or higher than a predetermined value after power-on of the lens-type camera 2B to direct the lens-type camera 2B toward the subject.

The lens-type camera 2B according to the third embodiment sets such a condition that acceleration detected by the acceleration sensor 200 is a predetermined threshold or higher as the first condition for determination immediately after power-on. Accordingly, based on the acceleration of the lens-type camera 2B, the lens-type camera 2B recognizes the desire of the camera user for prompt capturing of the subject through communication between the lens-type camera 2B and the communication device 3, thereby immediately establishing communication connection with the communication device 3 by using the default channel.

Fourth Embodiment

A fourth embodiment according to the present invention is hereinafter described.

In the following description, configurations and steps similar to the corresponding configurations and steps in the foregoing first embodiment have been given similar reference numbers, and detailed description of these configurations and steps is omitted or only briefly presented.

A communication system according to the fourth embodiment is different from the communication system 1 described in the foregoing first embodiment in that a different condition is adopted as the first condition for switching the communication mode of the lens-type camera 2.

A configuration of the communication system according to the fourth embodiment is hereinafter described.

Figure 9:
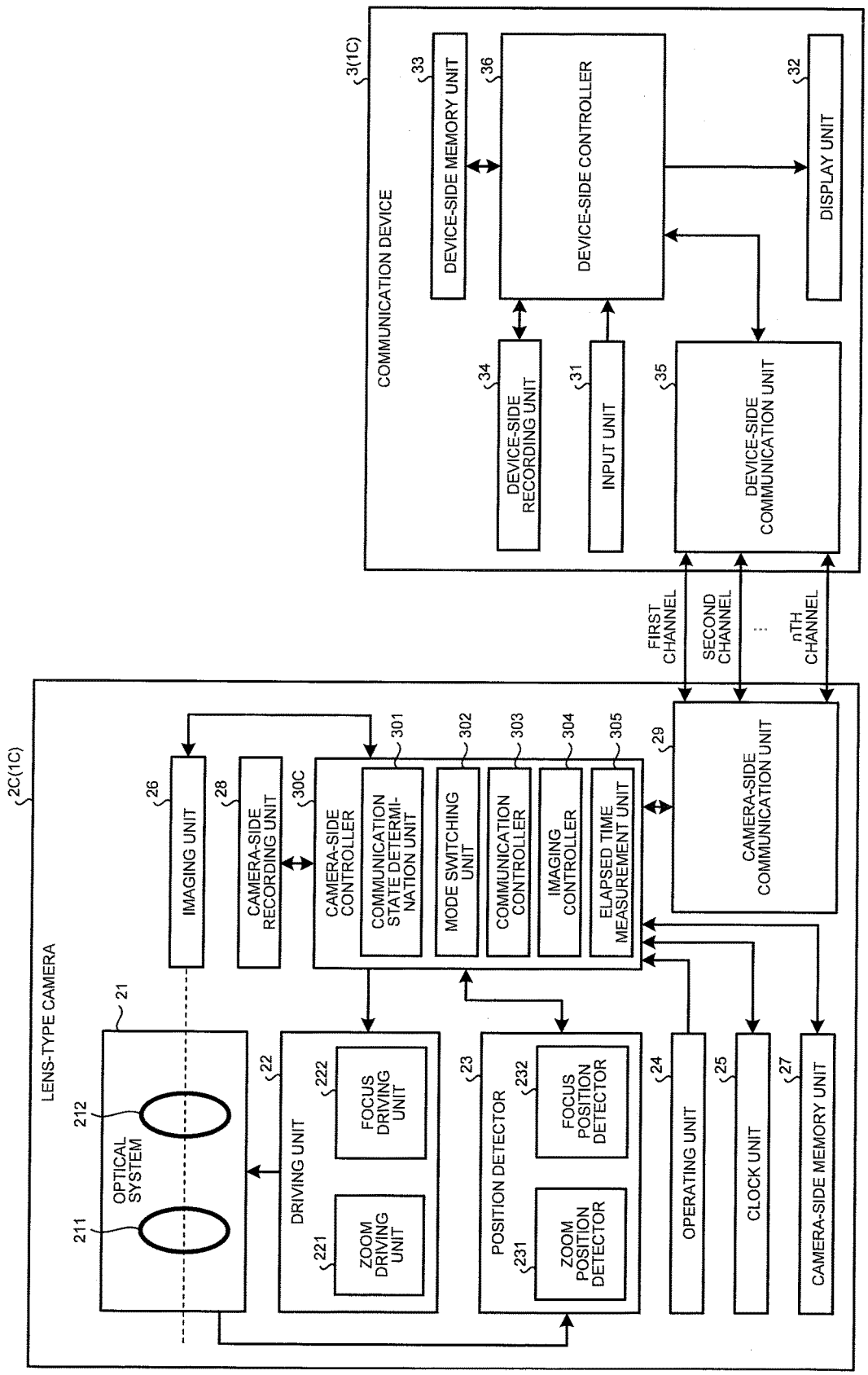
FIG. 9 is a block diagram illustrating a configuration of a communication system according to a fourth embodiment of the present invention.

FIG. 9 is a block diagram illustrating a configuration of a communication system 1C according to the fourth embodiment of the present invention.

The communication device 3 constituting the communication system 1C according to the fourth embodiment has a configuration similar to the configuration of the communication device 3 described in the foregoing first embodiment. Accordingly, only the lens-type camera 2C constituting the communication system 1C of the fourth embodiment is hereinafter described.

As illustrated in FIG. 9, the lens-type camera 2C according to the fourth embodiment adopts a camera-side controller 30C in place of the camera-side controller 30 of the lens-type camera 2 (FIG. 2) described in the foregoing first embodiment.

The camera-side controller 30C has an additional function for measuring an elapsed time (elapsed time measurement unit 305) as well as the functions of the camera-side controller 30 described in the foregoing first embodiment. Moreover, processing functions of the camera-side controller 30C (first condition for switching communication mode by the mode switching unit 302) are changed from the processing functions of the camera-side controller 30.

More specifically, the elapsed time measurement unit 305 measures an elapsed time from power-on of the lens-type camera 2C by a starting operation input to the operating unit 24 by the camera user (step S101: Yes (FIG. 3)) to an capturing operation input to the operating unit 24 by the camera user by using the time measuring function of the clock unit 25.

The capturing operation corresponds to a function executing operation according to the present invention. The function executing operation according to the present invention is not limited to the capturing operation, but may be other operations.

The mode switching unit 302 adopts the following condition as the first condition for determination in step S102 (FIG. 3).

The "first condition" in the fourth embodiment is a condition that an elapsed time measured by the elapsed time measurement unit 305 is shorter than a predetermined threshold. More specifically, the mode switching unit 302 determines that the first condition is met when the elapsed time measured by the elapsed time measurement unit 305 is shorter than the predetermined threshold (step S102: Yes). In this case, the lens-type camera 2C establishes communication connection with the communication device 3 by using the default channel in steps S103 and S104, and executes respective processes after step S107 in parallel with steps S105 and S106. The lens-type camera 2C determines that the capturing instruction has been input in step S107 (step S107: Yes), and executes imaging in step S108. When it is determined that the elapsed time measured by the elapsed time measurement unit 305 is the predetermined threshold or longer, the mode switching unit 302 determines that the first condition is not met (step S102: No).

The operation of the lens-type camera 2C according to the fourth embodiment is similar to the operation of the lens-type camera 2 (FIG. 3) described in the foregoing first embodiment except for the process described above. The operation of the communication device 3 according to the fourth embodiment is similar to the operation of the communication device 3 (FIG. 4) described in the foregoing first embodiment.

According to the fourth embodiment described above, the following advantages are offered as well as the foregoing advantages of the first embodiment.

When prompt capturing of a subject is desired through communication between the lens-type camera 2C and the communication device 3, the camera user may immediately input the capturing operation to the operating unit 24 after power-on of the lens-type camera 2C.

The lens-type camera 2C according to the fourth embodiment sets such a condition that the elapsed time from power-on of the lens-type camera 2C to the input of the capturing operation to the operating unit 24 is shorter than the predetermined threshold as the first condition for determination immediately after power-on. Accordingly, based on the elapsed time, the lens-type camera 2C recognizes the desire of the camera user for prompt capturing of the subject through communication between the lens-type camera 2C and the communication device 3, thereby immediately establishing communication connection with the communication device 3 by using the default channel.

Other Embodiments

The present invention is not limited only to the first through fourth embodiments specifically described herein.

According to the first through fourth embodiments described above, the lens-type cameras 2, and 2A through 2C have been discussed as an example of a portable device according to the present invention. However, the portable device may be other types of portable devices as long as a communication function is provided, such as a watch, a head-mount display, and other wearable devices attachable to a human body, and an ordinary digital camera.

According to the first, third, and fourth embodiments, the first condition for determination immediately after power-on may be a condition that a predetermined keyword such as "capturing" is contained in a word spoken by the camera user, or that a volume level of a voice spoken by the camera user is a predetermined value or larger, for example.

The order of the processes in each of the processing flows is not limited to the order illustrated in the flowcharts described in the foregoing first through fourth embodiments, but may be changed within a range not producing inconsistency.

Algorithms contained in the processes described in the flowcharts in the present specification may be described as programs. These programs may be recorded in a recording unit within a computer, or recorded in a computer-readable recording medium. The programs may be recorded in the recording unit or the recording medium at the time of shipment of the computer or the recording medium as a product, or by downloading via a communication network.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A portable device, comprising:
a first communication unit configured to communicatively connect with an external communication device by using any one of a plurality of communication channels;
a communication state determination unit configured to determine a communication state for each of the plurality of communication channels;
a mode switching unit configured to switch a communication mode of the portable device between: a stable communication mode for establishing communication connection with the communication device by using a communication channel in a preferable communication state in the plurality of communication channels in accordance with a determination result obtained by the communication state determination unit; and a connection priority communication mode for establishing communication connection with the communication device by using a predetermined communication channel in the plurality of communication channels without determination by the communication state determination unit;
a communication controller configured to start communication connection with the communication device via the first communication unit in the communication mode selected by the mode switching unit; and
an acceleration detector configured to detect acceleration of the portable device produced when a user moves the portable device within a predetermined time after a start of the portable device, wherein
the mode switching unit is configured to switch the communication mode of the portable device to the connection priority communication mode when the acceleration detected by the acceleration detector is a threshold or higher, and
the communication controller is configured to start communication connection with the communication device via the first communication unit in the connection priority communication mode selected by the mode switching unit after the portable device is started.

2. The portable device according to claim 1, wherein
the mode switching unit is configured to determine whether or not a first condition is met before establishment of communication connection with the communication device, and switch the communication mode of the portable device to the stable communication mode or the connection priority communication mode in accordance with the determination result of the first condition, and
the mode switching unit is configured to determine whether or not a second condition different from the first condition is met when the communication state determination unit determines that the communication state of the communication channel which has established communication connection with the communication device is not preferable after establishment of communication connection with the communication device, and switch the communication mode of the portable device to the stable communication mode or the connection priority communication mode in accordance with the determination result of the second condition.

3. The portable device according to claim 2, wherein
the first communication unit is configured to realize communication connection with the plurality of communication devices, and
the second condition is a state that communication connection with the plurality of communication devices is established.

4. The portable device according to claim 1, wherein the mode switching unit is configured to switch the communication mode of the portable device to the stable communication mode when communication connection with the communication device is difficult to establish in the connection priority communication mode selected by the mode switching unit as the communication mode of the portable device after a start of the portable device.

5. The portable device according to claim 1, further comprising an imaging unit configured to image a subject and generate image data of the subject, wherein the communication controller is configured to establish communication connection with the communication device via the first communication unit in the communication mode selected by the mode switching unit, and transmit the image data to the communication device.

6. A communication system comprising:
a portable device comprising:
a first communication unit configured to communicatively connect with an external communication device by using any one of a plurality of communication channels;
a communication state determination unit configured to determine a communication state for each of the plurality of communication channels;
a mode switching unit configured to switch a communication mode of the portable device between: a stable communication mode for establishing communication connection with the communication device by using a communication channel in a preferable communication state in the plurality of communication channels in accordance with a determination result obtained by the communication state determination unit; and a connection priority communication mode for establishing communication connection with the communication device by using a predetermined communication channel in the plurality of communication channels without determination by the communication state determination unit;

a communication controller configured to start communication connection with the communication device via the first communication unit in the communication mode selected by the mode switching unit; and an acceleration detector configured to detect acceleration of the portable device produced when a user moves the portable device within a predetermined time after a start of the portable device; and a communication device communicatively connecting with the portable device, wherein the mode switching unit is configured to switch the communication mode of the portable device to the connection priority communication mode when the acceleration detected by the acceleration detector is a threshold or higher, and the communication controller is configured to start communication connection with the communication device via the first communication unit in the connection priority communication mode selected by the mode switching unit after the portable device is started.

7. A communication connection method executed by a portable device, the method comprising:

detecting an acceleration of the portable device produced when a user moves the portable device within a predetermined time after a start of the portable device;

switching a communication mode of the portable device between a stable communication mode for establishing communication connection with an external communication device by using a communication channel in a preferable communication state in a plurality of communication channels provided for communication connection with the communication device in accordance with a determination result of a communication state for each of the plurality of communication channels, and a connection priority communication mode for establishing communication connection with the communication device by using a predetermined communication channel in the plurality of communication channels without determination of the communication state for each of the plurality of communication channels, wherein the communication mode of the portable device is switched to the connection priority communication mode when the acceleration detected is a threshold or higher; and starting communication connection with the communication device in the connection priority communication mode selected after the portable device is started.

8. A non-transitory computer-readable recording medium containing an executable program, the program instructing a processor of a portable device carried by a user to execute:

detecting an acceleration of the portable device produced when a user moves the portable device within a predetermined time after a start of the portable device;

switching a communication mode of the portable device between a stable communication mode for establishing communication connection with an external communication device by using a communication channel in a preferable communication state in a plurality of communication channels provided for communication connection with the communication device in accordance with a determination result of a communication state for each of the plurality of communication channels, and a connection priority communication mode for establishing communication connection with the communication device by using a predetermined communication channel in the plurality of communication channels without determination of the communication state for each of the plurality of communication channels, wherein the communication mode of the portable device is switched to the connection priority communication mode when the acceleration detected is a threshold or higher; and starting communication connection with the communication device in the connection priority communication mode selected after the portable device is started.

* * * * *